Patented Nov. 16, 1948

2,453,704

UNITED STATES PATENT OFFICE 2,453,704

FURFURYL ALCOHOL-PHENOLIC RESINS

Andrew P. Dunlop, Riverside, Ill., and Edward A. Reineck, Appleton, Wis., assignors to The Quaker Oats Company, Chicago, Ill., a corporation of New Jersey No Drawing. Application August 21, 1944, Serial No. 550,490

3 Claims. (Cl. 260—47)

The present invention relates to novel artificial resins consisting essentially of condensation products of furfuryl alcohol with phenolic compounds, and particularly such resins as are produced by condensation of the named substances in the absence of any added condensing agent or catalyst.

The condensation of furfuryl alcohol with various phenolic substances is already known. In carrying out such condensations, however, catalysts have invariably been found necessary. It has, however, not been known that furfuryl alcohol, which is 2-furyl carbinol $C_4H_3O.CH_2OH$, is capable of directly condensing with phenolic materials to form a resin in the absence of added condensing agents. Accordingly, the present invention has for one of its objects the preparation of resinous products by the condensation of furfuryl alcohol, i. e. 2-furyl carbinol, with aromatic compounds selected from the group broadly designatable as phenolic compounds, that is to say, compounds which contain the phenolic hydroxyl group, in the absence of added catalytically acting substances. Suitable compounds are the mono- and polyvalent phenols, such as phenol itself, cresol, resorcinol, and like hydroxybenzene compounds having a plurality of unsubstituted reactive nuclear positions and having no other reactive group than the phenolic hydroxy group.

It is a further object of the present invention to condense furfuryl alcohol with a phenolic substance as above defined, without resorting to the use of condensing agents.

A further object of the present invention is to condense furfuryl alcohol with a phenol or phenolic substance by the mere effects of heat, and, if desired, pressure; as for instance by operating within a suitable pressure type vessel or autoclave.

A further object of the invention is to further condense such furfuryl alcohol-phenolic resins with other aldehydes to produce still further complex compounds.

A still further object of the invention is to react furfuryl alcohol-phenolic resins with hardening agents, such for example as hexamethylenetetramine, acids, and the like.

Other objects of the invention will become apparent from the further description hereinbelow and the hereunto appended claims.

We have found that furfuryl alcohol and a suitable phenol or phenols may be condensed with each other without the use of any catalysts or condensing agents, by merely heating the substances together. Thus such condensation may be effected at temperatures of from about 100° C. to 220° C. and sometimes higher, and the reaction will proceed without becoming violent by reason of the fact that the reaction is readily controlled by controlling the heat. Accurate control of the products and their properties becomes possible. In their preliminary stages the resins obtained are usually in the form of liquids which are soluble in many organic solvents, such for example as acetone, ethyl acetate, dioxane, benzene, etc. The resins are heat-hardenable, the change being accelerated by the use of such catalysts as sulfuric acid and hexamethylenetetramine. Moreover, the resins can be further modified by their reaction with aldehydes, such for example as furfural and formaldehyde. When in admixture with the usual types of fillers and hardeners, the resins may also be used for the manufacture of molded articles. The resins are particularly valuable as laminating varnishes, using for this purpose suitable webs, such as paper or the like, which after proper impregnation with the resins are then consolidated under heat and pressure to form laminated sheets and other shapes.

In order to illustrate the invention, a number of examples will be given, it being understood, however, that these are not for purposes of limitation but rather of illustration.

EXAMPLE 1

A solution of one mol of phenol in two mols of furfuryl alcohol was heated in a closed autoclave to a temperature of between 190° and 200° C. Samples of the resin during its formation were drawn off at respectively 10 hours, 20 hours and 30 hours. In each case the product that was withdrawn was found to be a rather viscous but liquid resin or condensation product which was soluble in ethyl acetate, acetone, and other organic solvents.

In order to illustrate the application of such resins, the following data are given of the use of the 20 hour resin as a laminating varnish and for the preparation of a molding powder:

*Molding powder.*—100 parts of white pine flour, 100 parts of resin, 20 parts of hexamethylenetetramine, and 2 parts of calcium stearate were mixed in a Baker Perkins mixer. The mass was then milled at 285° F., for 6 minutes and granulated in a Wiley grinder. On molding the powder at 320° F., and 2000 pounds per square inch for 5 minutes, molded articles were obtained which had a tensile strength of 6630 pounds per square inch. The water-absorption of these pieces (24 hour immersion) was found to be 0.72%.

*Paper base laminates.*—Paper sheets were impregnated with varnishes prepared as per table I, using two types of solvents. Solvent A consisted of acetone as the resin solvent, the amount of hexamethylenetetramine used being dissolved in just sufficient water to dissolve it. Solvent B consisted of a mixture of 70 parts by volume of ethyl acetate (85–90%), 20 parts by volume of denatured ethyl alcohol, and 10 parts by volume of water. The concentration of the resin solution was so adjusted as to add about 40% of resin to the paper by the so-called "dip and flow" method. The impregnated paper was dried to a volatile content as shown, cross-laminated and pressed, all under the conditions stated in table I.

*Table I*

|  | 1 | 2 | 3 |
|---|---|---|---|
| Solvent | B | B | A |
| Resin content, per cent | 42 | 37 | 41 |
| Accelerator (hexa-per cent) | 10 | 20 | 20 |
| Tempering time in min. at 130° C | 4 | 4 | 4 |
| Volatile content, per cent | 5.5 | 4.8 | 4.0 |
| Pressing conditions | (1) | (1) | (1) |
| Specific Gravity of panel | 1.33 | 1.43 | 1.34 |
| Tensile, p. s. i | 20,600 | 23,800 | 21,000 |
| Mod. of Elasticity (p. s. i. × 10⁶) | 2.17 | 2.29 | 2.16 |
| Mod. of Rupture (p. s. i.) | 24,300 | 26,100 | 26,300 |
| Charpy notched impact (ft. lb./in.) | 0.69 | 0.69 | 0.62 |

¹ 300° F., 30 min., 100 lbs./sq. in.

In addition, 1000 parts of the resin were taken and distilled under a vacuum of 2–4 mm. of mercury in an oil bath at 150–160° C. for 3 hours to remove lower molecular weight products. The residue was dissolved in ethyl acetate to make a 50% solution after which hexamethylenetetramine (20% of resin weight) was added with enough water and alcohol to dissolve it and make a solution. This solution was used to impregnate paper sheets which were tempered for 4 minutes at 130° C., cross-laminated and pressed at 300° F., and 100 pounds per square inch for 30 minutes. The resulting panel was tested with the following result:

Resin content (per cent) _____ 39
Volatile content (per cent) _____ 3.0
Specific gravity of panel _____ 1.30
Tensile (p.s.i.) _____ 20,200
Modulus of elasticity (p.s.i.×10⁶) _____ 2.16
Modulus of rupture (p.s.i.) _____ 26,850
Charpy notched impact (ft. lb./in.) _____ 0.56

EXAMPLE 2

A solution of one mol of phenol in 4 mols of furfuryl alcohol was heated in a closed autoclave at a temperature of about from 190° to 200° C. Samples of the resin during the formation were drawn off at 6 and 7 hours respectively. The resins did not differ much from each other and in general were similar in appearance and properties to those described in Example 1.

EXAMPLE 3

A solution of one mol of phenol in 8 mols of furfuryl alcohol was heated in a closed autoclave at about 190° to 200° C., samples of the resin being withdrawn after 4½ and 5 hours. It appeared that even under these conditions, with a still greater excess of furfuryl alcohol relative to the phenol, that fusible resins having properties similar to those of Examples 1 and 2 were obtained.

EXAMPLE 4

A solution of one mol of phenol in 4 mols of furfuryl alcohol was heated at 185° to 198° C. in an autoclave adjusted so that any pressure developed in excess of 75 pounds per square inch was continuously relieved. Samples of the resin were withdrawn after 5 and 6 hours respectively. The resins formed were found to be useful for laminating, for molding, and in the preparation of coating compositions.

EXAMPLE 5

A solution of one mol of cresol in 2 mols of furfuryl alcohol was heated in an autoclave at a temperature of about 185° to 195° C. for a total of 65 hours. The resulting product was a mixture comprising a resinous gum and a supernatant aqueous layer. 26.5 grams of said mixture, plus 0.5 grams of hexamethylenetetramine were dissolved in 50 milliliters of acetone, the solution heated to drive off the volatiles, and the resin cured at 190° C. for several hours. There was obtained 20.3 grams of an insoluble and infusible resin. It is self-evident that the acetone solution just mentioned may be used to impregnate paper or other fabrics which may then be laminated and heated to produce panels and the like.

EXAMPLE 6

One mol of furfuryl alcohol and 1 mol of phenol were heated at 200° C. for 18 hours in a closed system. The resulting resin was then distilled under a vacuum of about 12 to 13 millimeters of mercury at a bath temperature of about 180° to 190° C. This served to volatilize and thus to remove low molecular weight components, leaving a final residue of 114 parts of resin. This resin was still completely soluble in ethyl acetate and in acetone. It was found, moreover, that the said resin was capable of being hardened by treatment with hexamethylenetetramine or by heating it with such condensing agents as sulfuric acid.

EXAMPLE 7

A condensation product was first prepared by condensing 2 mols of furfuryl alcohol with 1 mol of phenol at about 200° C. for 12 hours, similarly to Example 1. 60 grams of the thus formed resin, 60 grams of commercial 37% formalin, 15 grams of ammonium hydroxide (28% $NH_3$), and 240 milliliters of water were heated under a reflux condenser on a steam bath for 21 hours. The condenser was then removed and the mixture heated further for 4 hours on the water bath, then transferred to an oven and heated therein at 190° C. for 19 hours. This yielded a hard resin, which was ground in a Wiley mill and further cured at 190° C. for 4 hours. The ultimate yield of insoluble and infusible resin was 59.8 grams.

EXAMPLE 8

A process entirely like that described in Example 7, including quantities and times, was carried out, but with the substitution of 0.6 grams of sulfuric acid (96%) for the ammonium hydroxide. The ultimate yield of resin was 56.8 grams.

EXAMPLE 9

A process exactly like Example 7, including the use of ammonium hydroxide, was carried out, but using 71 grams of furfural in place of the formalin. The ultimate yield was 78.5 grams of resin.

EXAMPLE 10

This was identical with Example 9 except that 0.6 grams of sulfuric acid (96%) were used in place of the ammonium hydroxide. The ultimate yield was 53.6 grams.

In its broadest aspects, therefore, the present invention comprises the condensation of furfuryl alcohol with phenolic compounds in the absence of condensing agents, and the further condensation of the products thus formed with hardening agents or with aldehydes, hexamethylenetetramine, and the like.

Modifications of the present invention will be obvious to those familiar with the art of making and using artificial resins and are therefore to be considered as being within the scope and intent of the present invention.

What is claimed as new is:

1. The process of producing an artificial resin which consists in condensing one mol of phenol with from 1 to 8 mols of furfuryl alcohol at a temperature of 100° C. to 220° C.

2. The process of producing an artificial resin which consists in condensing one mol of cresol with from 1 to 8 mols of furfuryl alcohol at a temperature of 100° C. to 220° C.

3. The process of making artificial resins which consists in condensing one mol of an hydroxybenzene having a plurality of unsubstituted reactive nuclear positions and having no other reactive group than the phenolic hydroxy group with from 1 to 8 mols of furfuryl alcohol at a temperature of 100° C. to 220° C.

ANDREW P. DUNLOP.
EDWARD A. REINECK.

REFERENCES CITED

The following references are of record in the file of this patent:

UNITED STATES PATENTS

| Number | Name | Date |
|---|---|---|
| 2,243,481 | Meiler | May 27, 1941 |
| 2,300,812 | Rust | Nov. 3, 1942 |
| 2,321,493 | Korten | June 8, 1943 |
| 2,323,333 | Kauth | July 6, 1943 |
| 2,323,334 | Kauth | July 6, 1943 |
| 2,335,701 | Root | Nov. 30, 1943 |